(No Model.)
W. ANDREW.
ARTIFICIAL REFRIGERATION.
No. 379,264. Patented Mar. 13, 1888.
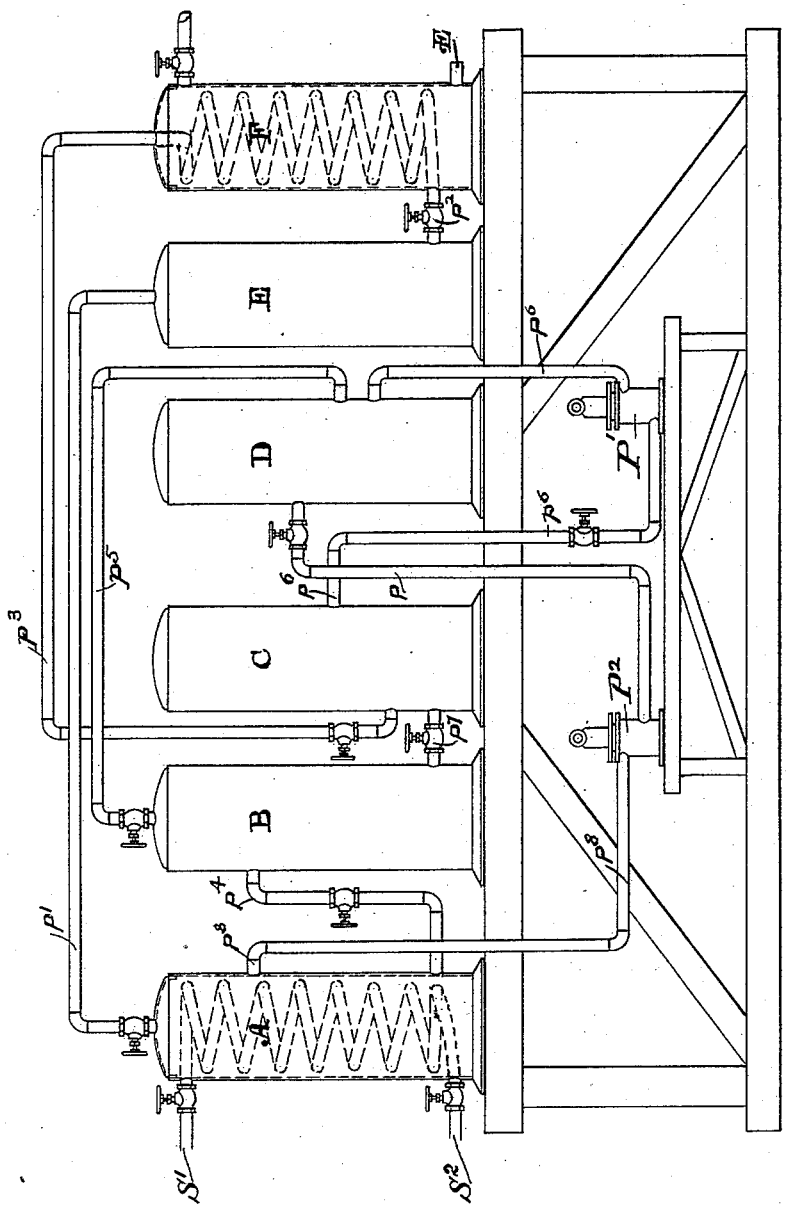
Attest.
C. D. Kerr,
Otto Pfleger
Inventor.
William Andrew,
By R. M. Hosea
Attorney.

UNITED STATES PATENT OFFICE.

WILLIAM ANDREW, OF CINCINNATI, OHIO.

ARTIFICIAL REFRIGERATION.

SPECIFICATION forming part of Letters Patent No. 379,264, dated March 13, 1888.

Application filed October 14, 1886. Serial No. 216,220. (No model.)

*To all whom it may concern:*

Be it known that I, WILLIAM ANDREW, a citizen of the United States, residing at Cincinnati, Ohio, have invented new and useful Improvements in Artificial Refrigeration, of which the following is a specification.

My invention relates to the refrigerating process and apparatus of the class known as the "Carré process and apparatus," (afterward improved by Reece,) in which cold is produced by the alternate compression of ammonia gas into liquid form and expansion thence into gaseous form.

As now employed in the arts this system is embodied in apparatus consisting of a series of tanks with pipe connections and pumps, wherein the liberation of the ammonia-gas from its containing liquid, its concentration and liquefaction by pressure, and its subsequent re-expansion into gaseous form and reabsorption by the mother-liquor whence it was derived, constitute and are conducted as a continuous cycle of operations with the same material, involving a minimum of waste. In such process as usually carried on, ammonia-water is heated in a strong vessel to expel the contained gas, which is condensed to liquid form by its own pressure under reduced temperature in a separate vessel, and is passed into an expansion-vessel or "refrigerator" containing strong brine or other non-congealable liquid, and by release of pressure allowed to resume its gaseous form in coils of pipe immersed in the brine. The ammonia-gas is thence passed into an absorber, where it is again brought into contact with and reabsorbed by the mother-liquor; and the latter is transferred to the "boiler" and again heated to drive off the gas as before.

In this process it is obvious, in the first place, that only a limited percentage of the ammonia-gas is driven off from the mother-liquor, because the operation is conducted under a pressure sufficient to liquefy the gas in the condenser. It is also obvious that the gas can be utilized in the refrigerator only to the extent of the reabsorbing capacity of the spent mother-liquor, by which it is again taken up in the regenerating portion of the process, which capacity necessarily depends upon the pressure and temperature in the absorber.

In practice the reabsorbing liquor is reduced to about atmospheric temperature, and as the reabsorption takes place under atmospheric pressure the absorbing capacity is limited to about twenty-six per cent. of ammonia-gas, which therefore constitutes the limit of original strength of ammoniated liquid available for use. Starting, then, with water of twenty-six per cent. of ammonia strength and heating to the pressure required to liquefy the gas, (say one hundred and eighty to two hundred pounds per square inch,) only about eight of the twenty-six parts contained gas can be driven off and utilized, leaving the spent liquor of eighteen per cent. remaining strength.

(The term "per cent." here used refers always to a fixed basis—that is, the quantity of ammoniated water used in a given round of operations—the figures being approximations only, and employed merely by way of illustration, and the same may be said of those following.)

In my improvement I am enabled to start with ammoniated liquor of about thirty-four per cent. strength and utilize in the refrigerator sixteen per cent., or about double the quantity available in the original apparatus. This I accomplish by the following changes in the method of operation, involving the use of two absorbers instead of one, and an additional tank which I term a "reducer"—that is to say, I take the eighteen per cent. spent mother-liquor from the boiler into the reducer, where, under a somewhat reduced pressure, it parts with, say, eight per cent. of the gas, reducing the strength to, say, ten per cent. This eight per cent. of gas passes over into the second absorber, where, under the forcing pressure still available in the reducer (say ninety pounds) and at the low temperature of the absorber, it is absorbed by the water therein contained; but this water has already passed through the first absorber under the following circumstances: After being deprived of the extra eight per cent. of gas in the reducer and being thereby reduced in strength to ten per cent., the water is cooled down, as usual, and passed into the first absorber, where, under atmospheric pressure, or thereabout, it receives and reabsorbs the sixteen per cent. of gas passing from the refrigerator, increasing its strength to twenty-six per cent. Thence it is passed into the second absorber, where, as already explained, it is made to absorb the eight per cent. of gas driven off in the reducer, thus restoring the strength to thirty-four per cent., as at the beginning. It will thus be seen that I deprive the spent mother-liquor of an additional percentage of gas for the purpose of giving the spent liquor the additional absorbing capacity required to take up the increased quantity of gas utilized in the refrigerator and hold this gas in temporary abeyance to recharge the mother-liquor up to the abnormal strength required.

In this improvement, by which the capacity of the system is largely increased, I require little or no additional fuel, and the additional apparatus may be connected with the existing plant with but little outlay.

I have indicated in the drawings accompanying and illustrating this specification, in elevation, the principal features—tanks, pipe connections, and pumps—constituting the ordinary apparatus employed in the "ammonia process," together with the additional apparatus required in my improved process.

A designates the boiler, provided with steam-coils, supplied at $s'$ and exhausted at $s^2$, by which the ammonia-water is heated to drive off the contained gas; B, a reducer into which the partially-spent liquor is first admitted from the boiler for the purpose of depriving it of a further quantity of gas; C and D, absorbers in which the recombination of the gas and mother-liquor is effected; E, the "condenser," and F the refrigerator.

With the exception of the reducer B, the second absorber, D, the additional pump, and their pipe connections, the apparatus is such as is usually employed and requires no detailed description. The parts thus excepted I have added to the apparatus in carrying out my invention. The reducer may be provided with a jacket or coils, and heated by steam, if required.

Following is a description of the process as applied to the apparatus shown: The ammonia-gas, driven from the mother-liquor in the boiler A by heat, passes by pipe $p'$ into the condenser E; thence, liquefied by its own pressure, it passes into refrigerator F by pipe $p^2$; is re-expanded therein and passed thence by pipe $p^3$ into the first absorber, C, in the usual manner, where it is absorbed by water taken from the reducer B, as hereinafter explained. The partially-spent mother-liquor of the boiler A, instead of being taken directly into absorber C to meet and reabsorb this gas from the refrigerator, is by my improved process first passed by pipe $p^4$ into the reducer B, where, communication being opened by pipe $p^5$ with the auxiliary or second absorber, D, (containing liquid which has been previously partly charged with gas and transferred from the first absorber, C, by means of pump $p'$ through pipe $p^6$,) the pressure is relieved and it parts with a further portion of its gas, which goes to increase the percentage of gas already absorbed by the liquid in the second absorber, D. The liquid contents of the reducer B thus reduced in strength is admitted into the regenerator C by pipe $p^7$, where it meets and reabsorbs the gas returning from the refrigerator F, as before explained; but as its strength has been considerably reduced by the second deprivation of gas in the reducer B its absorptive capacity is relatively increased, and it consequently takes up the increased quantity of gas given off by the boiler and returning from the refrigerator. The extra quantity of gas driven off from the reducer B is passed to and absorbed by this same liquid after the latter has been transferred into the second absorber, and the mother-liquor, thus practically restored to its original strength, is pumped back by pump $P^2$ and pipe $p^8$ into boiler A.

To recapitulate, the course of the gas is as follows: It is driven by heat from the mother-liquor in boiler A to condenser E, there liquefied by pressure, passed into refrigerator F, expanded and reabsorbed in the liquid contained in first absorber, C. This liquid is then passed into the second absorber, D, and made to absorb a further installment of gas, as follows: The spent mother-liquor from the boiler is transferred to the reducer B, deprived of a further percentage of gas, (which gas is that last above referred to,) and is then run into the first absorber, C, and absorbs the gas returning from the refrigerator F, after which it is pumped into the second absorber, D, and absorbs the second installment of gas from the reducer B, as before stated.

It will be understood that in practice there are two "runs" of water and of gas passing through the apparatus at the same time, the gas of one run being absorbed by the water of the preceding run. It will also be understood that in being transferred from the reducer the liquor is passed through suitable coils and cooled in the usual manner.

I claim as my invention and desire to secure by Letters Patent of the United States—

1. The improvement in the Carré process of ammonia refrigeration, consisting, first, in subjecting the partially-spent liquor of the still (after separation of the gas utilized in refrigeration) to a second deprivation of gaseous ammonia; second, absorbing the gas first produced (after its utilization in refrigeration) into the doubly-weakened liquor thus obtained, and, third, then absorbing the gas last produced into the thus partially-strengthened liquor to restore the original strength of the liquor for another round of useful operation, substantially as set forth.

2. The improved process of producing artificial cold from ammoniated water, consisting, first, in separating (by heat applied to the mother-liquor) the gas required for refrigerating purposes; second, condensing said gas to a liquid by the pressure produced in the operation of separating it from the mother-liquor; third, refrigerating by re-expansion of the liquefied gas; fourth, separating an additional amount of gas from the partially-spent mother-liquor by reduction of pressure with or without additional heat; fifth, charging the thus doubly-weakened liquor with the gas first produced by natural absorption; sixth, recharging the thus partially-strengthened liquor by the gas last produced, under the pressure of the last separation, to restore its initial ammonia strength, substantially as set forth.

3. In a Carré refrigerating apparatus, the combination, with the still, condenser, refrigerator, and absorber, of a reducer with pipe connections for the transfer of the partially-spent mother-liquor from the still into the same, pipe connections from the reducer to the (primary) absorber for the transfer of the doubly-weakened liquor thereto, and pipe connections from the refrigerator to the primary absorber for the passage of the expanded gas into the latter, an additional (secondary) absorber with pipe connections to the primary absorber for the transfer of the partially-strengthened liquor from the latter to the former, and pipe connections from the reducer to the secondary absorber for the transfer of the additional gas to the partially-strengthened liquor, and pipe connections from the secondary absorber to the still to restore the fully-strengthened liquor thereto, and suitable pumps and connections to effect these transfers, substantially as set forth.

In testimony whereof I have hereunto set my hand in the presence of two subscribing witnesses.

WILLIAM ANDREW.

Witnesses:
L. M. HOSEA,
C. D. KERR.